United States Patent
Brubaker

(10) Patent No.: US 10,537,062 B2
(45) Date of Patent: Jan. 21, 2020

(54) AERIAL VEHICLE SYSTEMS AND METHODS

(71) Applicant: CNH Industrial America LLC, New Holland, PA (US)

(72) Inventor: Christopher Brubaker, Leola, PA (US)

(73) Assignee: CNH Industrial America LLC, New Holland, PA (US)

(*) Notice: Subject to any disclaimer, the term of this patent is extended or adjusted under 35 U.S.C. 154(b) by 144 days.

(21) Appl. No.: 15/606,286

(22) Filed: May 26, 2017

(65) Prior Publication Data

US 2018/0338422 A1 Nov. 29, 2018

(51) Int. Cl.
| | | |
|---|---|---|
| A01D 41/127 | (2006.01) | |
| A01D 41/12 | (2006.01) | |
| A01D 75/30 | (2006.01) | |
| B64C 39/02 | (2006.01) | |
| G06F 9/46 | (2006.01) | |
| H04N 1/00 | (2006.01) | |

(Continued)

(52) U.S. Cl.
CPC ..... A01D 41/1275 (2013.01); A01D 41/1208 (2013.01); A01D 75/30 (2013.01); B64C 39/024 (2013.01); G06F 9/46 (2013.01); H04N 1/00129 (2013.01); H04W 4/70 (2018.02); B64C 2201/146 (2013.01); H04N 2201/0001 (2013.01)

(58) Field of Classification Search
CPC .............. A01D 41/1275; A01D 75/30; A01D 41/1208; A01D 41/127; A01D 43/085; A01D 41/1278; A01D 75/185; G06F 9/46; H04N 1/00129; H04N 2201/0001; B64C 39/024; B64C 2201/127; B64C 2201/027; B64C 2201/024; B64C 2201/146; B64C 2201/122; H04W 4/70; G05D 1/0094; A01B 79/005; A01B 69/008

See application file for complete search history.

(56) References Cited

U.S. PATENT DOCUMENTS

| | | | |
|---|---|---|---|
| 5,569,081 | A | 10/1996 | Baumgarten et al. |
| 5,685,245 | A | 11/1997 | Bassett |

(Continued)

FOREIGN PATENT DOCUMENTS

| | | |
|---|---|---|
| DE | 102012223434 | 6/2014 |
| DE | 102014201203 | 7/2015 |

(Continued)

OTHER PUBLICATIONS

U.S. Appl. No. 15/402,832, filed Jan. 10, 2017, Timothy Aaron Newlin.

(Continued)

*Primary Examiner* — Nga X Nguyen
(74) *Attorney, Agent, or Firm* — Peter K. Zacharias; Patrick M. Sheldrake

(57) ABSTRACT

A system includes an agricultural vehicle having a first storage container configured to store an agricultural product, a support vehicle having a second storage container, and an aerial vehicle having one or more sensors configured to monitor a fullness of the second storage container. The aerial vehicle is configured to provide a first signal indicative of the fullness of the second storage container to the agricultural vehicle.

19 Claims, 5 Drawing Sheets

(51) Int. Cl.
*H04W 4/00* (2018.01)
*H04W 4/70* (2018.01)

(56) References Cited

U.S. PATENT DOCUMENTS

| | | | |
|---|---|---|---|
| 5,809,440 A | 9/1998 | Beck et al. | |
| 6,866,580 B2 | 3/2005 | Weichholdt et al. | |
| 7,001,269 B2 | 2/2006 | Weichholdt | |
| 7,044,853 B2 | 5/2006 | Weichholdt | |
| 7,063,613 B2 | 6/2006 | Weichholdt | |
| 7,066,810 B2 | 6/2006 | Farley et al. | |
| 7,306,174 B2 | 12/2007 | Pearson et al. | |
| 7,485,035 B1 | 2/2009 | Yde | |
| 7,487,024 B2 | 2/2009 | Farley et al. | |
| 7,877,970 B1 | 2/2011 | Crosby | |
| 8,010,262 B2 | 8/2011 | Schroeder et al. | |
| 8,177,610 B2 | 5/2012 | Birrell et al. | |
| 8,393,137 B1 | 3/2013 | Crosby | |
| 8,463,510 B2 | 6/2013 | Knapp | |
| 8,909,389 B2 * | 12/2014 | Meyer | A01B 69/008 460/1 |
| 8,924,030 B2 | 12/2014 | Wendte et al. | |
| 8,961,284 B2 | 2/2015 | Wagner et al. | |
| 9,220,195 B2 | 12/2015 | Eggenhaus et al. | |
| 9,282,688 B2 | 3/2016 | Casper et al. | |
| 9,563,848 B1 | 2/2017 | Hunt | |
| 2006/0183519 A1 | 8/2006 | Benes | |
| 2007/0026915 A1 | 2/2007 | Anderson et al. | |
| 2009/0099737 A1 | 4/2009 | Wendte et al. | |
| 2009/0111548 A1 | 4/2009 | Landuyt | |
| 2012/0048159 A1 | 3/2012 | Adams et al. | |
| 2012/0048160 A1 | 3/2012 | Adams et al. | |
| 2012/0245802 A1 | 9/2012 | Schlesser et al. | |
| 2013/0133315 A1 * | 5/2013 | Shibutani | F01N 9/002 60/311 |
| 2013/0324199 A1 | 12/2013 | Roberge et al. | |
| 2014/0066148 A1 | 3/2014 | Dilts et al. | |
| 2014/0303814 A1 | 10/2014 | Burema et al. | |
| 2015/0066932 A1 | 3/2015 | Stuber et al. | |
| 2015/0264864 A1 | 9/2015 | Branch et al. | |
| 2015/0305224 A1 | 10/2015 | Casper et al. | |
| 2015/0310721 A1 | 10/2015 | Johnson | |
| 2015/0351321 A1 | 12/2015 | Shane | |
| 2016/0050840 A1 | 2/2016 | Sauder et al. | |
| 2016/0106022 A1 | 4/2016 | Adams et al. | |
| 2016/0106038 A1 | 4/2016 | Boyd et al. | |
| 2016/0134844 A1 | 5/2016 | Casper et al. | |
| 2016/0245703 A1 | 8/2016 | Takase et al. | |
| 2017/0112043 A1 | 4/2017 | Nair et al. | |
| 2017/0112055 A1 | 4/2017 | Depreitere et al. | |
| 2017/0212059 A1 | 7/2017 | Charvat et al. | |
| 2018/0125000 A1 | 5/2018 | Levy et al. | |
| 2018/0310474 A1 | 11/2018 | Posselius et al. | |

FOREIGN PATENT DOCUMENTS

| | | |
|---|---|---|
| DE | 102014201203 A1 | 7/2015 |
| DE | 102016202627 | 8/2017 |
| EP | 3150037 | 4/2017 |
| EP | 3167698 | 5/2017 |
| KR | 20150136641 A | 12/2015 |
| WO | 2015067797 A1 | 5/2015 |
| WO | 2015154148 A1 | 10/2015 |
| WO | 2015177190 | 11/2015 |

OTHER PUBLICATIONS

EP 18171500.4 European Search Report dated Oct. 22, 2018.
PCT Application No. PCT/US2018/030522 International Search Report and Written Opinion dated Jul. 11, 2018, 14 pgs.
Bauer, Th, and P. Strauss; "A rule-based image analysis approach for calculating residues and vegetation cover under field conditions." ELSEVIER; Catena 113 (2014) 363-369.
Riegler-Nurscher, Peter, Johann Prankl, Thomas Bauer, Peter Strauss, and Heinrich Prankl;"An Integrated Image Analysis System for the Estimation of Soil Cover." CIGR-AgEng conference; Jun. 26-29, 2016, Aarhus, Denmark.

* cited by examiner

AERIAL VEHICLE SYSTEMS AND METHODS

BACKGROUND

The present disclosure relates generally to aerial vehicle systems and methods, and more particularly, to systems and methods including an aerial vehicle configured to obtain and to provide information about an agricultural vehicle and/or an agricultural field.

Certain agricultural vehicles (e.g., harvesters) may be operated within an agricultural field. For example, a harvester processes agricultural crops, collects agricultural products from the crops, and deposits residue from the crops on the agricultural field as the harvester travels across the agricultural field. An operator of the harvester may control the harvester to follow certain paths and to avoid certain terrain features. However, the operator may have limited visibility of the harvester and the agricultural field, which may result in reduced yields and/or reduced operational efficiency, for example.

BRIEF DESCRIPTION

Certain embodiments commensurate in scope with the present disclosure are summarized below. These embodiments are not intended to limit the scope of the claims, but rather these embodiments are intended only to provide a brief summary of possible forms of the system and/or methods disclosed herein. Indeed, the systems and/or methods may encompass a variety of forms that may be similar to or different from the embodiments set forth below.

In one embodiment, a system includes an agricultural vehicle having a first storage container configured to store an agricultural product, a support vehicle having a second storage container, and an aerial vehicle having one or more sensors configured to monitor a fullness of the second storage container. The aerial vehicle is configured to provide a first signal indicative of the fullness of the second storage container to the agricultural vehicle.

In one embodiment, a non-transitory computer-readable medium includes instructions that when executed by a processor cause the processor to receive a first signal indicative of a characteristic of a crop located forward of an agricultural vehicle from an aerial vehicle as the agricultural vehicle travels across an agricultural field and to adjust a ground speed of the agricultural vehicle based on the first signal received from the aerial vehicle.

In one embodiment, a method includes receiving, at a processor, a first signal obtained by one or more sensors of an aerial vehicle as the aerial vehicle hovers over an agricultural field. The method also includes generating, using the processor, a residue map of the agricultural field using the first signal. The method further includes instructing, using the processor, a display to provide the residue map on a screen of the display within an agricultural vehicle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
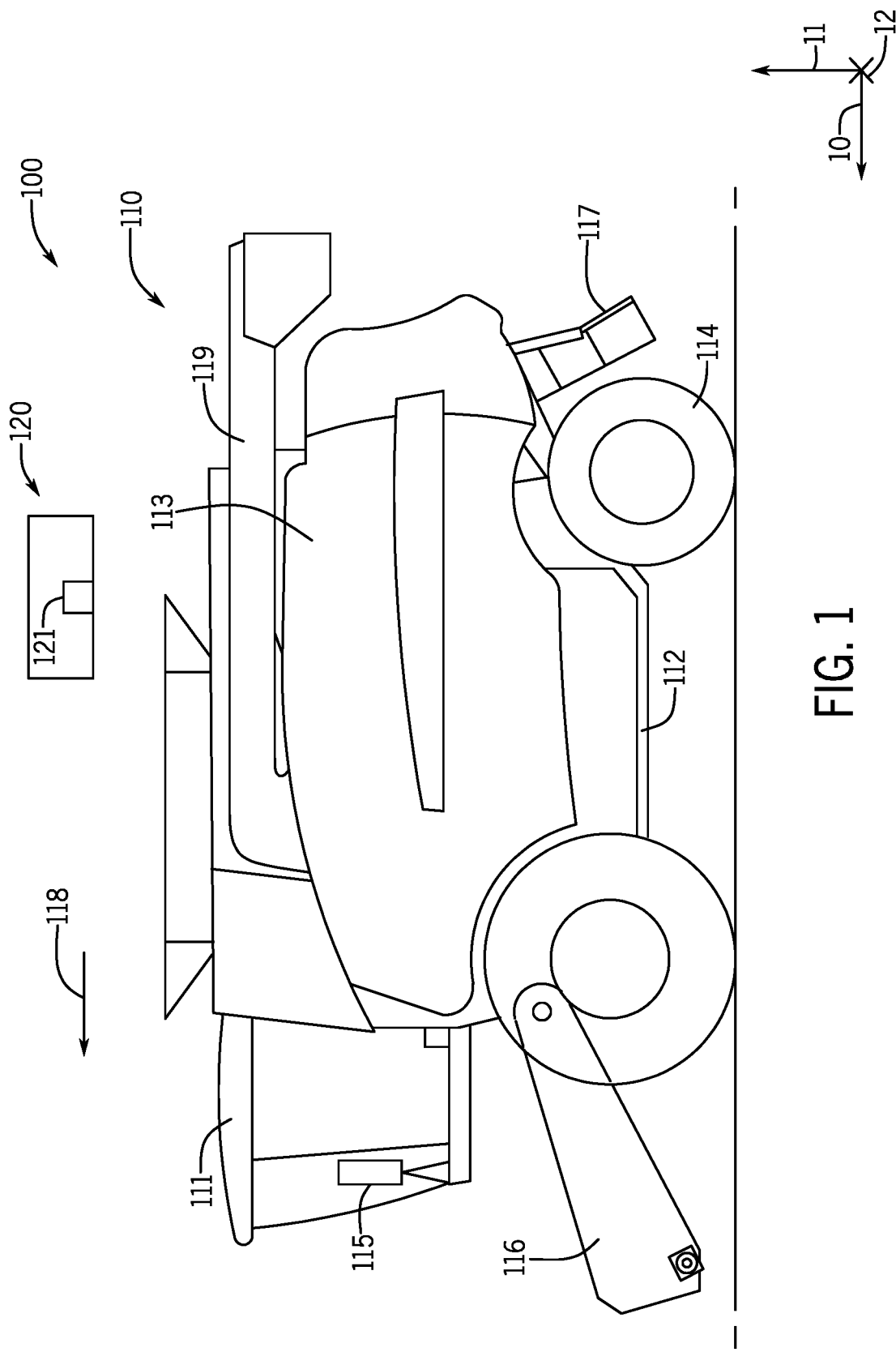
FIG. 1 is a side view of a system having a harvester and an aerial vehicle, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Agricultural vehicles (e.g., harvesters, tractors, trucks, etc.), may move about and carry out operations in an agricultural field. For example, a harvester may process agricultural crops and deposit residue from the agricultural crops as the harvester travels across the agricultural field. An operator may sit in an operator cab and control the agricultural vehicle based on the operator's visual observation of surrounding terrain features. However, visibility of the agricultural vehicle and the surrounding terrain features may be limited. The present disclosure relates to systems and methods that utilize a monitoring vehicle, such as an aerial vehicle (e.g., drone, unmanned aerial vehicle, or remotely operated aerial vehicle), that is configured to obtain and to provide information (e.g., surface images, sensor data, or the like) about the agricultural vehicle and/or the agricultural field. For example, the aerial vehicle may hover above the agricultural vehicle and may provide an image (e.g., still photo or a video) of the agricultural vehicle and/or the agricultural field, such as a portion of the agricultural field at which a tool (e.g., header) of the agricultural vehicle is being used to cut or collect the crop. The aerial vehicle may provide substantially real-time information, including relatively high-resolution images or maps (e.g., as compared to satellite images), as the aerial vehicle and/or the agricultural vehicle travel about the agricultural field, thereby improving operator visibility, as well as improving operational efficiency and/or crop yield, for example.

To facilitate discussion, the present disclosure is described primarily in relation to a harvester. However, it should be appreciated the techniques described in the present disclosure are not limited to harvesters. In fact, the techniques described in the present disclosure may be implemented in any suitable context involving coordinating, monitoring, and/or controlling operation of one or more work vehicles, such as an agricultural context utilizing one or more agricultural vehicles (e.g., tractors, balers, etc.) and/or a construction context utilizing one or more construction vehicles (e.g., trucks, bulldozers, front loaders, etc.).

Turning now to the drawings, FIG. 1 is a side view of an embodiment of a system 100 (e.g., monitoring system or aerial vehicle system) that includes a harvester 110 and an aerial vehicle 120. In the illustrated embodiment, the harvester 110 includes a cab 111 and a chassis 112. In certain embodiments, the chassis 112 is configured to house a motor (e.g., diesel engine, etc.) and other components (e.g., an electrical system, a cooling system, etc.) that facilitate operation of the harvester 110. In addition, the chassis 112 may be configured to support the cab 111, a bin 113 (e.g., crop bin or storage container), and wheels 114, which may be driven to rotate by the motor. While the illustrated harvester 110 includes wheels 114, it should be appreciated that in alternative embodiments, the harvester may include tracks or a combination of wheels and tracks.

In some embodiments, the cab 111 may be configured to house an operator. Accordingly, the harvester 110 may include an operator interface 115 (e.g., having a display, speaker, and/or inputs, such as buttons or switches) positioned within the cab 111 to provide information to the operator and/or to facilitate operator control of the harvester 110. In some embodiments, various other inputs or controls, such as a joystick or steering wheel, may be positioned within the cab 111 to facilitate operator control of the harvester 110. For example, the inputs may enable the operator to control rotational speed and/or orientation of the wheels 114, thereby facilitating adjustment of the speed and/or direction of the harvester 110. In addition, the inputs may facilitate operator control of various tools or components, such as a header 116 that is configured to collect crops from the agricultural field, a residue spreader 117 that is configured to discharge or spread residue to the agricultural field, and/or a feeder tube 119 (e.g., conduit) that is configured to discharge agricultural product from the bin 113 to another storage container (e.g., a grain elevator, grain cart, or truck). For example, in operation, as the harvester 110 travels across the agricultural field, the header 116 may collect crops from the agricultural field and direct the crops into a crop-processing portion (e.g., having various tools, such as a threshing mechanism, sieves, fans, chopper, etc.) of the harvester 110. The crops are processed to separate a portion that is collected (e.g., agricultural product) from a portion that is returned to the field (e.g., residue). The portion that is collected is provided to the bin 113, and the portion that is returned to the agricultural field is discharged via the residue spreader 117. To facilitate discussion, the harvester 110 may be described with reference to a forward direction of travel 118, a longitudinal axis or direction 10, a vertical axis or direction 11, and a lateral axis or direction 12.

As shown, the system 100 also includes the aerial vehicle 120. The aerial vehicle 120 may be autonomously controlled (e.g., self-controlled via programmed settings) and/or remotely controlled, such as via operator input at the operator interface 115 of the harvester 110 and/or via operator input at a remote base station, for example. In some embodiments, the aerial vehicle 120 may support one or more sensors 121 (e.g., cameras, acoustic sensors, optical sensors, moisture sensors, thermal sensors, wind speed sensors, or the like) that are configured to monitor and to obtain data (e.g., images and/or data related to obstacles, crops, residue, fill levels, harvester, humidity, temperature, wind speed, or the like) associated with the harvester 110 and/or the area surrounding the harvester 110.

As discussed in more detail below, the aerial vehicle 120 may be configured to move about the agricultural field and/or to hover over the harvester 110 (e.g., at a fixed position relative to a reference point of the harvester 110) to obtain the data, which may be communicated (e.g., wirelessly communicated) to and output via the operator interface 115, thereby enhancing the operator's visibility of the agricultural field and/or knowledge of the harvesting operations. For example, in some embodiments, the data obtained by the aerial vehicle 120 may be utilized (e.g., by a controller, which may be located at the harvester 110 or a remote base station) to monitor a characteristic of the residue (e.g., a width, evenness, and/or a density of a residue mat), to monitor a characteristic (e.g., density) of the crop in front of the harvester 110, to monitor a fill level (e.g., current fullness) of the bin 113 and/or other storage container located in the agricultural field (e.g., a bin of a grain cart or truck that receives the agricultural product from the harvester 110), to monitor a position of the header 116 relative to an edge of the crop in the agricultural field, and/or to monitor and/or detect obstacles in the agricultural field.

In some embodiments, the data obtained by the aerial vehicle 120 may be utilized to adjust (e.g., automatically adjust) components of the harvester 110. For example, the data may be utilized (e.g., by the controller and/or by the operator) to adjust features of the residue spreader 117 to discharge the residue across a desired width and/or at a desired evenness, thickness, and/or density, to adjust a ground speed of the harvester 110 and/or to adjust crop-processing components of the harvester 110 to adequately process the crop given the density of the crop in front of the harvester 110, to stop harvesting operations and/or to transfer the agricultural product from the bin 113 to another storage container to avoid overfilling the bin 113, to control distribution of the product from the bin 113 to another storage container to fill the other storage container to an appropriate level (e.g., 100 percent full), to steer the harvester 110 and/or to adjust a position of the header 116 to align the header 116 with the crop edge, and/or to stop the harvester 110 or to temporarily raise the header 116 to avoid contact with a rock or other obstacle detected in the agricultural field. In some embodiments, the data may be utilized (e.g., by a controller) to generate and to provide (e.g., via a display) instructions to an operator to adjust the harvester 110 and/or components of the harvester 110 in the manner set forth above.

In some embodiments, the data obtained by the aerial vehicle 120 may be utilized (e.g., by the controller) to provide alarms (e.g., visual or audible alarms), such as if the harvester 110 approaches an obstacle identified based on the data obtained by the aerial vehicle 120, if the header 116 is more than a predetermined distance from the crop edge, if a characteristic of the residue mat is outside of a predetermined range, if a density of the crop in front of the harvester 110 exceeds a density appropriate for the current ground speed or other crop-processing settings of the harvester 110, if the products in the bin 113 or other storage container reach a certain level (e.g., volume or fill level), for example.

In some embodiments, the data obtained by the aerial vehicle 120 may be utilized to generate and/or to update a map of the agricultural field. For example, the data may be utilized to generate a residue map that provides an indication of residue coverage, such as a location of residue, a percentage of a surface of the agricultural field covered by residue, an evenness and/or thickness and/or density of residue within the agricultural field, or the like. In some embodiments, the residue map may be combined with other information (e.g., previously obtained information, stored information, operator input information), such as obstacles, topography, boundaries, agricultural crop yield maps, or the like, into a single map (e.g., by the controller), thereby forming a modified residue map (e.g., a combined map or precision prescription rate map). The residue map (or modified residue map) may be utilized to control subsequent tillage and/or seeding/planting operations. For example, the residue map may be utilized during seeding/planting operations to control application rate and/or seed spacing, and/or the residue map may be utilized during tillage operations to control the penetration depth of tilling tools. In addition, the residue map may be utilized to determine a target degree of tilling for each section of the agricultural field. Further, the residue map may be utilized to determine distribution of fertilizer for each section of the agricultural field, as less fertilizer may be needed in regions of the agricultural field that have more residue present.

Although one harvester 110 and one aerial vehicle 120 are shown in FIG. 1 to facilitate discussion, it should be understood that any suitable number of harvesters 110 (e.g., 1, 2, 3, 4, 5, 6, 7, 8, 9, 10, or more) and any suitable number of aerial vehicles 120 (e.g., 1, 2, 3, 4, 5, 6, 7, 8, 9, 10, or more) may be provided within the system 100. For example, in some embodiments, the system 100 may include one harvester 110 and at least two aerial vehicles 120. In some such cases, one or more aerial vehicles 120 may move with (e.g., move automatically with or be wirelessly tethered to) the harvester 110 to monitor and/or provide a view of the header 116, the residue spreader 117, the bin 113, and/or the area surrounding the harvester 110, while another aerial vehicle 120 may move separately from the harvester 110 or maintain a fixed position relative to the agricultural field to monitor and/or provide a different view, such as a relatively wider view of the agricultural field. In some embodiments, the system 100 may include multiple harvesters 110 and/or other vehicles (e.g., support vehicles, such as trucks or grain carts), each having one or more designated aerial vehicles 120 that moves with the respective vehicle to monitor and/or provide a view of the area surrounding the respective vehicle, for example. In some such cases, one or more additional aerial vehicles 120 may be provided to monitor and/or provide a different view, such as a relatively wider view of the agricultural field. In some embodiments, the system 100 may include multiple harvesters 110 and one aerial vehicle 120 may monitor and/or provide a wide view of the multiple harvesters 110 within the agricultural field and/or may move between the various harvesters 110.

Although certain embodiments herein are described with reference to the aerial vehicle 120 to facilitate discussion, it should be understood that in some embodiments, the system 100 may additionally or alternatively include any of a variety of monitoring vehicles, including one or more surface vehicles, such as autonomous rovers, remote-controlled rovers, or manned rovers, for example. In some such cases, the surface vehicles may include the one or more sensors 121, which may obtain data as the monitoring vehicles travels across the field. The data may then be provided to the controller and/or used (e.g., alone or in combination with data provided from the one or more sensors 121 of the one or more aerial vehicles 120) in any of the various monitoring and mapping techniques disclosed herein. For example, data from the one or more sensors 121 attached to the one or more surface vehicles and data from the one or more sensors 121 of the one or more aerial vehicles 120 may be utilized to generate the residue map. It should be understood that the harvester 110 may include the one or more sensors 121 that are configured to obtain data that may also be utilized in any of the various monitoring and mapping techniques disclosed herein.

Figure 2:
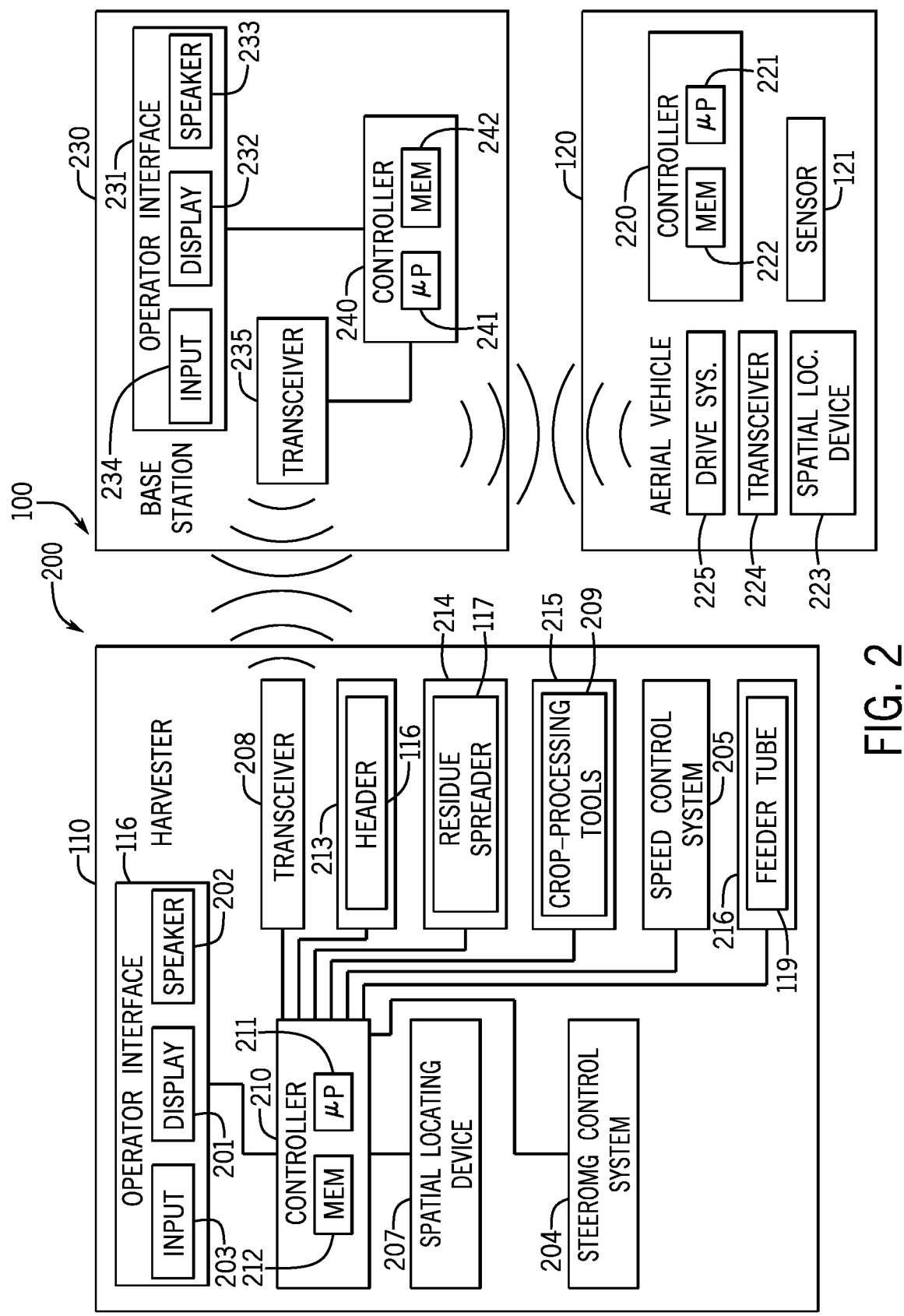
FIG. 2 is a block diagram of a control system configured to control operation of the harvester and/or the aerial vehicle of FIG. 1, in accordance with an embodiment of the present disclosure.

FIG. 2 is a block diagram of a control system 200 configured to control operation of the harvester 110 and the aerial vehicle 120 of FIG. 1, in accordance with an embodiment of the present disclosure. Various components of the control system 200 may be included or provided within (e.g., mounted to) the harvester 110 and the aerial vehicle 120. In the illustrated embodiment, the harvester 110 includes the operator interface 115, which includes various output devices and input devices, such as a display 201 (e.g., a touchscreen display), a speaker 202, and an input 203 (e.g., button or switch), configured to provide information to and/or receive inputs from an operator of the harvester 110. For example, the operator interface 115 may be configured to present data obtained by the one or more sensors 121 of the aerial vehicle 120 to an operator (e.g., an image obtained by the one or more sensors 121) and/or a map (e.g., residue map) generated based on the data via the display 201.

The operator interface 115 may also be configured to enable an operator to provide inputs (e.g., via the input 203 or virtual input on the display 201) to control certain components and/or functions of the harvester 110 (e.g., starting and stopping the harvester 110, etc.), the header 116 attached to the harvester 110 (e.g., raising and lowering the header 116, etc.), the residue spreader 117 attached to the harvester 110 (e.g., adjusting a width of residue discharge), the feeder tube 119 attached to the harvester 110 (e.g., to remove products from the bin 113), and/or various crop-processing tools 209 (e.g., tools or components that process crops, such as a threshing mechanism, sieves, fans, chopper, or the like). The operator interface 115 may also be configured to enable an operator to provide inputs to control certain functions of the aerial vehicle 120 (e.g., moving a position of the aerial vehicle 120, adjusting a zoom level and/or a field of view provided by the aerial vehicle 120, operating the one or more sensors 121, etc.). In addition, the operator interface 115 (e.g., via the display 201 or the speaker 202) may be configured to provide an alarm (e.g., visual or audible alarm, such as a text message, light, beep or other sound, or the like), such as if the harvester 110 approaches an obstacle detected by the aerial vehicle 120 or other alarms disclosed herein, for example.

As shown, the harvester 110 includes a steering control system 204, a speed control system 205, a spatial locating system 207, a transceiver 208, a header control system 213, a residue spreader control system 214, a crop-processing tool control system 215, and a feeder tube control system 216. The harvester 110 includes a controller 210 (e.g., electronic controller or vehicle controller) having a processor 211 and a memory device 212, and the controller 210 is communicatively coupled to the steering control system 204, the speed control system 205, the spatial locating system 207, the transceiver 208, and various other components and systems of the harvester 110 (e.g., systems 213-216). The steering control system 204 may be configured to control a direction of movement of the harvester 110, the speed control system 205 may be configured to control a speed (e.g., ground speed) of the harvester 110, and the spatial locating system 207 may be configured to determine a position of the harvester 110. As will be appreciated, the spatial locating system 207 may include any suitable system configured to determine the position of the harvester 110, such as a global positioning system (GPS) or global navigation satellite system (GNSS), for example. In certain embodiments, the spatial locating system 207 may be configured to determine the position of the harvester 110 relative to a fixed point within the field (e.g., via a fixed radio transceiver). Accordingly, the spatial locating system 207 may be configured to determine the position of the harvester 110 relative to a fixed global coordinate system (e.g., via the GPS or GNSS) or a fixed local coordinate system.

The header control system 213 may be configured to control a position (e.g., vertical position) and/or movement (e.g., rotation or reciprocating motion) of a cutting device (e.g., knife, teeth, cutting bar, or the like) or other components (e.g., reel, auger, conveyor, or the like) that facilitate crop harvesting or reaping. The residue spreader control system 214 may be configured to control a width or other dimension of an outlet of the residue spreader 117, an orientation of the outlet, or other components (e.g., chopper that chops the residue) that facilitate discharge of the residue from the harvester 110. The crop-processing tool control system 215 may be configured to control the crop-processing tools 208 (e.g., rotation of a threshing drum, a fan speed, an orientation of sieves, etc.). The feeder tube control system 216 may be configured to control movement of the feeder tube 119 relative to the harvester 110, as well as to control various other components (e.g., auger, conveyor belt, or the like) to facilitate transfer of the product from the bin 113 of the harvester 110 to another vehicle (e.g., support vehicle, such as a truck or grain cart) or to a grain elevator, for example.

In the illustrated embodiment, the aerial vehicle 120 includes the one or more sensors 121 and a controller 220 (e.g., electronic controller or aerial vehicle controller) having a processor 221 and a memory device 222. As shown, the controller 220 is communicatively coupled to a spatial locating system 223, a transceiver 224, and a drive system 225 of the aerial vehicle 120. The spatial locating system 223 may be configured to determine a position of the aerial vehicle 120, and the spatial locating system 223 may include any suitable system configured to determine the position of the aerial vehicle 120, including those discussed above with respect to the spatial locating system 207 of the harvester 110. The spatial locating systems 207, 223 may enable determination (e.g., by a controller, such as the controller 210) or provide confirmation that the harvester 110 and/or the aerial vehicle 120 are in the desired position relative to one another and/or the agricultural field, for example. The drive system 225 (e.g., propulsion system) may include a motor, a propeller, or the like that enable the aerial vehicle 120 to lift off the ground, fly, hover, and/or change directions to move about the worksite.

As noted above, the one more sensors 121 of the aerial vehicle 120 may include an imaging system, such as a camera configured to obtain still and/or moving images (e.g., videos). In some embodiments, the one or more sensors 121 of the aerial vehicle 120 may include an acoustic sensor configured to emit and to detect acoustic waves (e.g., ultrasound waves) to facilitate detection of objects in the agricultural field, including underground objects (e.g., rocks). In some embodiments, the one or more sensors 121 of the aerial vehicle 120 may include an optical sensor (e.g., infrared sensor) configured to emit and to detect light (e.g., infrared light) to facilitate detection of objects in the agricultural field, including underground objects (e.g., rocks), for example. In some embodiments, the one or more sensors 121 may include a humidity sensor configured to monitor a humidity level, a temperature sensor configured to monitor an air temperature, and/or a wind speed sensor configured to monitor a wind speed about the aerial vehicle 120. The sensors 121 described herein are merely provided as examples to facilitate discussion and are not intended to be limiting. It should be understood that the one or more sensors 121 may include any of a variety of sensors (e.g., capacitance sensors, radar sensors, light detection and ranging [LiDAR] sensors, terahertz sensors, thermal sensors, electromagnetic sensors, etc.) configured to monitor and to generate signals indicative of various characteristics of the agricultural field, the air about the agricultural field, the harvester 110, and/or the aerial vehicle 120, for example.

In the illustrated embodiment, the control system 200 includes a base station 230 (e.g., remote base station that may be physically separate from the harvester 110 and the aerial vehicle 120). In some embodiments, the remote base station 230 may be a personal and/or mobile computing device, such as a mobile phone, tablet, or the like. As shown, the base station 230 includes an operator interface 231 having various output and input devices, such as a display 232, a speaker 233, and an input 234 (e.g., button or switch). In the illustrated embodiment, the base station 230 includes a transceiver 235 and a controller 240 (e.g., electronic controller or base station controller) having a processor 241 and a memory device 242.

The transceiver 208 in the harvester 110, the transceiver 224 in the aerial vehicle 120, and/or the transceiver 235 in the base station 230 may be configured to establish a wireless communication link with one another. As will be appreciated, the transceivers 208, 224, 235 may operate at any suitable frequency range within the electromagnetic spectrum. For example, in certain embodiments, the transceivers 208, 224, 235 may broadcast and receive radio waves within a frequency range of about 1 GHz to about 10 GHz. In addition, the transceivers 208, 224, 235 may utilize any suitable communication protocol, such as a standard protocol (e.g., Wi-Fi, Bluetooth, mesh networking, etc.) or a proprietary protocol. Thus, the transceivers 208, 224, 235 may enable the transmission of data (e.g., the data obtained by the one or more sensors 121 of the aerial vehicle 120) and control signals (e.g., input via the inputs 203, 234) between the harvester 110, the aerial vehicle 120, and/or the base station 230.

In certain embodiments, the controllers 210, 220, 240 disclosed herein are electronic controllers having electrical circuitry configured to process signals, such as signals generated by the one or more sensors 121 of the aerial vehicle and/or control signals provided via inputs, such as the inputs 203, 234, for example. In the illustrated embodiment, the controllers 210, 220, 240 include respective processors 211, 221, 241 and memory devices 212, 222, 242. The controllers 210, 220, 240 may also include one or more storage devices and/or other suitable components. The processors 211, 221, 241 may be used to execute software. For example, the processor 211 of the controller 210 of the harvester 110 may be configured to receive signals from the one or more sensors 121 and to execute software to generate a map (e.g., residue map) based on the signals and/or to carry out any of a variety of processes in accordance with the present disclosure. Moreover, the processors 211, 221, 241 may include multiple microprocessors, one or more "general-purpose" microprocessors, one or more special-purpose microprocessors, and/or one or more application specific integrated circuits (ASICS), or some combination thereof. For example, the processors 211, 221, 241 may include one or more reduced instruction set (RISC) processors. It should be appreciated that while certain examples provided herein describe the controller 210 of the harvester 110 to facilitate discussion, various processing and control steps may be carried out by the controller 220, 240.

The memory devices 212, 222, 242 may include a volatile memory, such as random access memory (RAM), and/or a nonvolatile memory, such as ROM. The memory devices 212, 222, 242 may store a variety of information and may be used for various purposes. For example, the memory devices 212, 222, 242 may store processor-executable instructions (e.g., firmware or software) for the processors 211, 221, 241 to execute, such as instructions for processing signals generated by the one or more sensors 121 to generate the residue map, controlling the aerial vehicle 120, controlling the harvester 110, controlling components of the harvester 110, and/or generating alarms. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., existing or previously generated residue maps, yield maps, field boundaries, characteristics of the harvester 110, thresholds or ranges, etc.), instructions (e.g., software or firmware for generating the residue map of the agricultural field, controlling the aerial vehicle 120 and its components, controlling the harvester 110 and its components, etc.), and any other suitable data.

In operation, in some embodiments, the harvester 110 may be guided about the agricultural field and the header 116 may be positioned to collect crops, which are processed by the crop-processing tools 209, such that the agricultural product is deposited into the bin 113 and the residue is discharged via the residue spreader 117. In certain embodiments, the aerial vehicle 120 may be linked (e.g., wirelessly tethered) to the harvester 110, and thus, may automatically move with the harvester 110. For example, the aerial vehicle 120 may be programmed to maintain or hover at a fixed position relative to a fixed reference point of the harvester 110 (e.g., a designated center point or coordinate axis of the harvester 110), such as a fixed position proximate to the header 116 that enables the aerial vehicle 120 to monitor and/or to provide images of the header 116 and/or the crop edge proximate to the header 116, a fixed position forward of the harvester 110 that enables the aerial vehicle 120 to monitor and/or to provide data related to a density of crops in front of the harvester 110, a fixed position rearward of the harvester 110 that enables the aerial vehicle 120 to monitor and/or to provide data related to the residue discharged from the reside spreader 117, and/or a fixed position vertically above the harvester 110 or other vehicle that enables the aerial vehicle 120 to monitor and/or to provide data indicative of a fullness of the bin 113 and/or storage container of the other vehicle. In some embodiments, the aerial vehicle 120 may be programmed to maintain or hover at a fixed position relative to a fixed reference point of the agricultural field (e.g., the fixed global coordinate system or the fixed local coordinate system). In some embodiments, the fixed position may be preprogrammed and/or selected from several preprogrammed fixed positions (e.g., at manufacturing and/or by the operator prior to conducting a harvesting operation).

Additionally or alternatively, in some embodiments, the aerial vehicle 120 (e.g., the one or more sensors 121, the drive system 235, etc.) may be remotely controlled, such as via operator inputs at the operator interface 115 within the harvester 110 and/or via operator inputs at the operator interface 231 at the base station 230. For example, the operator may provide inputs that are communicated to the drive system 225 to adjust the position of the aerial vehicle 120. In some such cases, the operator may remotely control the aerial vehicle 120 to move to various desired locations about the harvester 110 and/or about the agricultural field (e.g., as the harvester 110 travels through the agricultural field). In some embodiments, the operator may control the aerial vehicle 120 to a desired position relative to the harvester 110 and/or relative to the agricultural field (e.g., the fixed global coordinate system or the local coordinate system) and then instruct the aerial vehicle 120 to maintain the desired position relative to the harvester 110 and/or relative to the agricultural field.

As discussed above, the one or more sensors 121 of the aerial vehicle 120 may be configured to obtain various data, and the data may be provided to the harvester 110 and/or the base station 230 (e.g., via the transceivers 208, 224, 235) for processing (e.g., by the controllers 210, 240) and/or output (e.g., via the operator interface 115, 231). In some embodiments, the controller 210 of the harvester 110 and/or the controller 240 of the base station 230 may receive and process the data from the one or more sensors 121 of the aerial vehicle 120. For example, the controller 210 and/or the controller 240 may be configured to generate a map (e.g., residue map or modified residue map) of the agricultural field based on the data received from the one or more sensors 121. In some embodiments, the residue map may depict an image of residue obtained by the one or more sensors 121 or a schematic diagram indicative of characteristics (e.g., coverage, location, thickness, density) of the residue mat within the agricultural field. The residue map may be combined with or overlaid by other data, such as objects (e.g., rocks) detected via the one or more sensors 121, and/or information input by the operator and/or accessed from a memory device (e.g., the memory device 212), such as topography, boundaries, crop yield maps, or the like.

In some embodiments, the controller 210 and/or the controller 240 may be configured to process the data from the one or more sensors 121 to generate substantially real-time and/or high-resolution images or moving images, such as videos. For example, an image depicting the distance (e.g., lateral distance) between the crop edge and the header 116 may enable the operator of the harvester 110 to work close to the crop edge, thereby improving efficiency and/or crop yield. In some embodiments, an image depicting a fullness of the bin 113 or other storage container may be used by the operator to control operation of the feeder tube 119 to avoid overfilling and/or to visually monitor operation of the feeder tube 119 and related components during discharge of the products from the bin 113. In some embodiments, the controller 210 and/or the controller 240 may be configured to analyze the image (e.g., to identify obstacles, position of header 116, crop density, residue mat characteristics, fullness of the bin 113 or storage container, position of the feeder tube 119, or the like) via any suitable machine vision technique, image processing technique, and/or object detection technique, such as color and/or gradient recognition, pattern recognition, template matching, feature extraction, database search and matching, object classification, image registration, filtering, edge detection, or the like, and then provide an output based on the analysis (e.g., an output, such as a displayed output, audible output, text message, alarm, or the like, indicating the location of obstacles, position of the header 116, crop density, residue mat characteristics, fullness of the bin 113 or storage container, position of the feeder tube 119, or the like).

In some embodiments, the controller 210 may be configured to generate an alarm (e.g., a visual or audible alarm provided via the operator interfaces 115, 231) based on the data received from the one or more sensors 121. For example, the controller 210 may generate an alarm if data received from the one or more sensors 121 indicates obstacles (e.g., new obstacles) that were previously unknown (e.g., not stored in the memory device or identified in existing maps) and/or if the harvester 110 approaches an obstacle detected by the aerial vehicle 120 or if other alarm conditions disclosed herein are met. In addition, the operator interface 115 (e.g., via the display 201 or the speaker 202) may be configured to provide an alarm (e.g., visual or audible alarm, such as a text message, light, beep or other sound, or the like).

In some embodiments, the controller 210 may be configured to generate control signals to control (e.g., automatically control without operator input) the harvester 110, components of the harvester 110, and/or the aerial vehicle 120 (e.g., to control the ground speed and/or steering of the harvester 110, to block movement of the header 116 of the harvester 110, to move the aerial vehicle 120, to operate the one or more sensors 121 of the aerial vehicle 120, etc.) based on the data obtained by the one or more sensors 121 of the aerial vehicle 120. For example, in response to detection of an obstacle, the controller 210 may be configured to provide control signals to the speed control system 205 to adjust the ground speed, to the steering control system 204 to adjust the steering angle of the harvester 110, and/or to the header control system 213 to raise the header 116 relative to the ground and/or to block operation of the header 116 of the harvester 110, if such operation would interfere with identified obstacles, or the like. For example, in response to detection of or determination that a distance between the header 116 and the crop edge exceeds a predetermined distance, the controller 210 may provide a control signal to the steering control system 204 to steer the harvester 110 until the distance within the predetermined distance. For example, in response to detection of or determination that a characteristic of the residue is unacceptable, the controller 210 may provide a control signal to the residue spreader system 214 to adjust components of the residue spreader 117 (e.g., outlet size or orientation) to discharge the residue across a desired width, evenness, density, and location. For example, in response to detection of or determination of a density of the crop in front of the harvester 110, the controller 210 may provide a control signal to the speed control system 205 to adjust a ground speed of the harvester 110 and/or to the crop-processing tool system 215 to adjust crop-processing tools 209 (e.g., increase fan speed, increase space or orientation of sieves, or the like) to effectively process crops (e.g., separate the product from the residue). For example, in response to detection of or determination that the agricultural product in the bin 113 exceeds a certain level, the controller 210 may provide a control signal to the feeder tube control system 216 to move the feeder tube 119 relative to the harvester 110 and/or to initiate the transfer of the agricultural product to another storage container (e.g., of a support vehicle, such as a truck or a grain cart, or to a grain elevator). In some embodiments, in response to detection of or determination of a level of the agricultural product in a storage container of another vehicle (e.g., support vehicle, such a truck or a grain cart), the controller 210 may provide a control signal to adjust the feeder tube 119 and various related components (e.g., augers, conveyor belts, fans, etc.), such as to move the feeder tube 119 relative to the harvester 110, to initiate or stop transfer of the product from the bin 113 via the feeder tube 119, to adjust a transfer rate of the product to the storage container, or the like.

It should be understood that the controller 240 of the base station 230 may be configured to process the data from the one or more sensors 121 of the aerial vehicle 120 and to provide outputs (e.g., maps, images, alarms, control signals, progress reports) in a similar manner. Furthermore, in some embodiments, the controller 240 of the base station 230 is configured to process the data from the one or more sensors 121 and to relay the data, the maps, images, the alarms, and/or the control signals to the controller 210 of the harvester 110, which may then utilize the control signals to control the harvester 110 and/or provide such information to the operator of the harvester 110 via the operator interface 115. It should be understood that the system 100 may include any suitable number of harvesters 110, aerial vehicles 120, and/or base stations 230. For example, one or more base stations 230 may be configured to communicate with (e.g., to provide data and/or control signals to and/or to receive data from) multiple harvesters 110 and/or multiple aerial vehicles 120.

Figure 3:
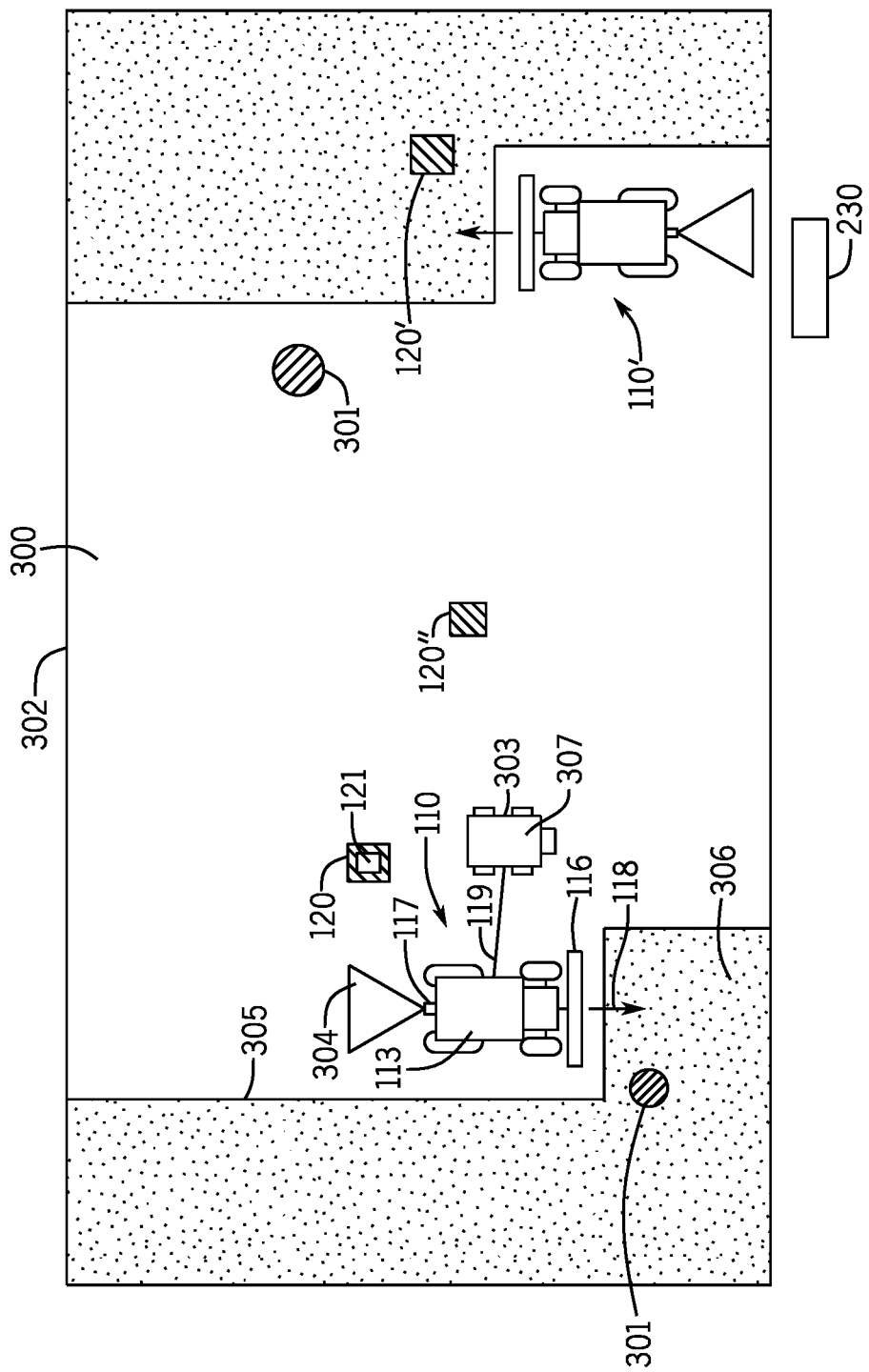
FIG. 3 is a schematic diagram of the harvester and the aerial vehicle of FIG. 1 within an agricultural field, in accordance with an embodiment of the present disclosure.

With the foregoing in mind, FIG. 3 is a schematic diagram of the harvester 110 and the aerial vehicle 120 of FIG. 1 within an agricultural field 300, in accordance with an embodiment of the present disclosure. As shown, the agricultural field 300 may include various obstacles and features, such obstacles 301 (e.g., rocks), boundaries or fences 302, other harvesters 110', other aerial vehicles 120', 120", other vehicles 303 (e.g., support vehicles, such as grain bins or trucks). The aerial vehicle 120 may be configured to obtain data indicative of the various obstacles and features of the agricultural field 300 and to provide the data to the harvester 110 and/or to the base station 230, in the manner discussed above with respect to FIGS. 1 and 2. It should be understood that the other aerial vehicle 120' may similarly obtain data indicative of the various obstacles and features of the agricultural field 300 and provide the data to the other work vehicle 110' and/or the base station 230. Furthermore, in some embodiments, one or more additional aerial vehicles 120" may be provided to monitor the various obstacles and features of the agricultural field 300 and may provide data to the harvesters 100, 110' and/or the base station 230. In some such cases, the aerial vehicle 120 may be configured to move with the harvester 110 (e.g., fixed position relative to the harvester 110 and/or be controlled by the operator of the harvester 110), the other aerial vehicle 120' may be configured to move with the other harvester 110' (e.g., fixed position relative to the other harvester 110' and/or controlled by the operator of the other harvester 110'), and the additional aerial vehicle 120" may be in a fixed position relative to the agricultural field (e.g., based on the fixed global coordinate system or a fixed local coordinate system) and/or controlled by an operator, such as an operator at the base station 230 and/or an operator at a harvester, such as one or both harvesters 110, 110'.

In the illustrated embodiment, the aerial vehicle 120 is positioned rearward of the harvester 110 relative to the direction of travel 118 of the harvester 110. In this position, the one or more sensors 121 of the aerial vehicle 120 may monitor the residue 304 as it is discharged from the residue spreader 117. In some embodiments, the one or more sensors 121 may monitor various characteristics of the residue 304 as it travels from an outlet of the residue spreader 117 to the ground and/or various characteristics of the residue mat on the ground. For example, the one or more sensors 121 may be configured to detect the velocity of the residue 304 as it exits the outlet of the residue spreader 117 and/or drift of the residue 304 due to wind or other factors. In some embodiments, the one or more sensors 121 may obtain images of the residue mat on the ground, which may then be processed (e.g., by the controller 210) to determine residue coverage (e.g., by detecting the color difference between the residue and the ground). From this determination, the controller 210 may determine various properties of the residue, including what percentage of the surface of the agricultural field is covered by residue, the average size of the residue, the width (e.g., lateral) and/or the thickness (e.g., vertical) and/or density of the residue mat, the evenness of the spread of the residue (i.e., how uniformly the residue is distributed), or the like. As discussed above, the operator or the controller 210 may then control the residue spreader 117 or other related components to adjust an orientation, a direction, a velocity, and/or a width of discharge of the residue (e.g., to discharge the residue at a desired location and/or with a desired density). The controller 210 may generated a residue map or other map that provides an indication of the residue within the agricultural field. It should be appreciated that the aerial vehicle 120 may be moved about the harvester 110 and/or other aerial vehicles 120 may be provided to monitor a proximity of the header 116 to a crop edge 305, to monitor a density of a region of crops 306 in front of the harvester 110, to monitor a fullness of the bin 113 or a storage container 307 of the other vehicle 303, and/or to detect obstacles 301 in the agricultural field 300, for example.

Figure 4:
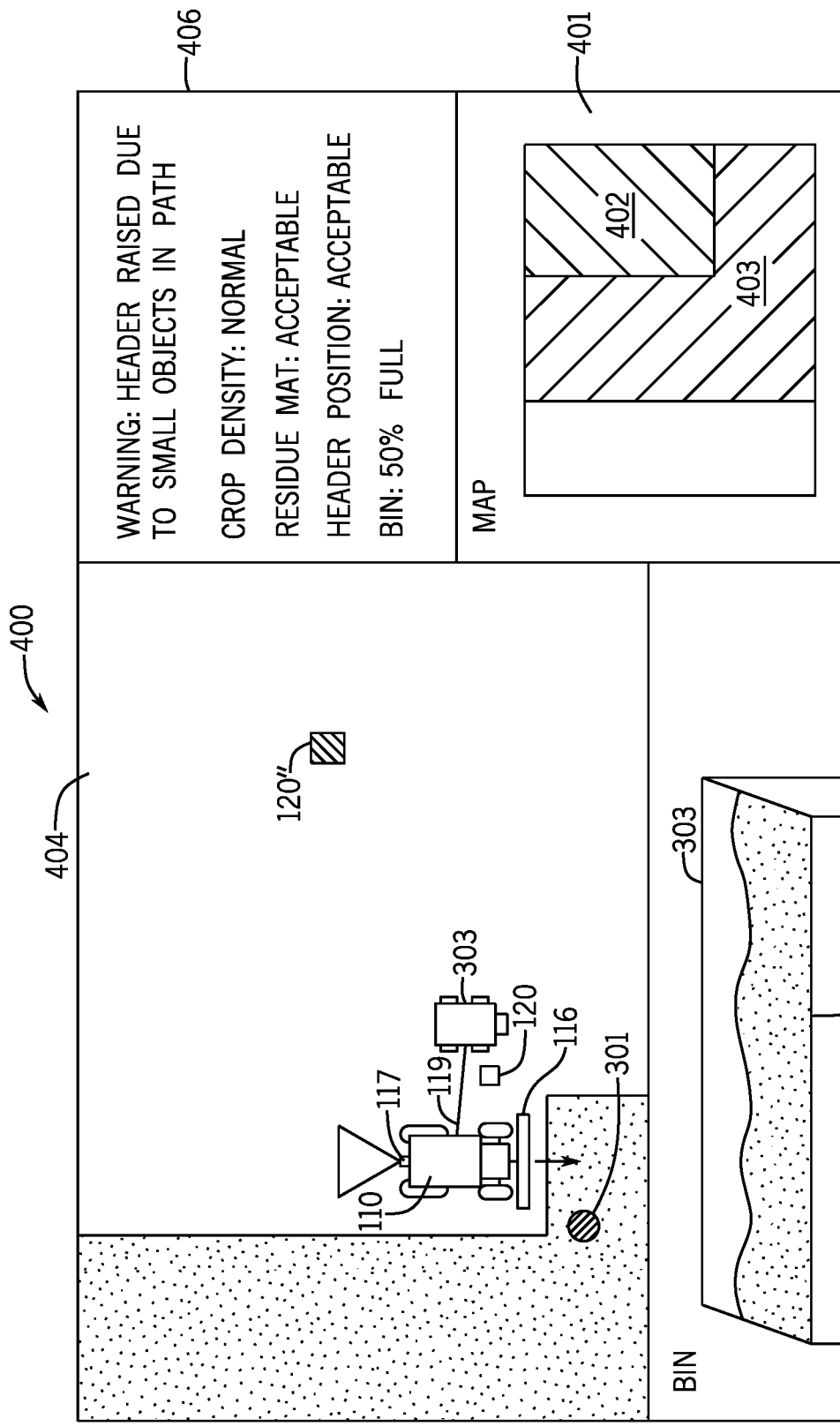
FIG. 4 is a schematic diagram of a display that may be provided within the harvester of FIG. 1, in accordance with an embodiment of the present disclosure.

FIG. 4 is a schematic diagram of a screen 400 that may be shown on a display, such as the display 201 within the harvester 100 and/or the display 232 at the base station 230 (FIG. 2), for example. As shown, the screen 400 may include a map 401 (e.g., residue map) indicative of residue coverage of the agricultural field. For example, a first portion 402 of the map 401 may indicate a first residue density and a second portion 403 of the map 401 may indicate a second residue density. In some embodiments, the map 401 may be a modified residue map having information related to residue overlaid or combined with other information. The screen 400 also includes an image 404 of the harvester 110 traversing the agricultural field, which may be obtained by one or more aerial vehicles 120. In the illustrated embodiment, the image 404 may include a wide-view image of the agricultural field obtained by the additional aerial vehicle 120" (FIG. 3).

As shown, the image 404 may include (e.g., overlaid) various other features, such as obstacles (e.g., rocks), the fences or boundaries 302, and/or a location of other aerial vehicles 120', for example. The map 401 and/or image 404 may be generated, updated, and provided to the operator on the screen 400 as the harvester 110 traverses the agricultural field. It should be appreciated that the image 404 may be a video that updates in substantially real-time as the harvester 110 travels through the agricultural field. It should be understood that the map 401 and the image 404 are merely exemplary and that information and data disclosed herein may be arranged, combined, and displayed in any suitable manner.

In the illustrated embodiment, the screen 400 also includes an image 405 obtained by the aerial vehicle 120 proximate a storage container of the other vehicle (e.g., vehicle 303 in FIG. 3). As such, the image 405 includes a close-up view of the storage container. Such an image may facilitate transfer of the product by the operator or enable the operator to visualize and confirm that the automated transfer of the product is proceeding. In the illustrated embodiment, the screen 400 also includes a portion 406 that provides various information, such as alarms (e.g., text messages) if the harvester 110 approaches an obstacle or any of the alarms disclosed herein, for example. As shown, the screen 400 may provide other information based on determinations and/or outputs of the controller 210, 240, such as an indication that operation of the header 116 is raised vertically relative to the ground to avoid an obstacle or feature of the agricultural field, characteristics of the residue mat, fullness of the bin 113 or storage container (e.g., a percent full), crop density in front of the harvester 110, distance between the crop edge and the header 116, or the like. It should be understood that the operator may be able to adjust the configuration of the screen 400 to show images obtained by a different aerial vehicle 120, images obtained at different times, and/or images of different portions of the harvester 110, to overlay different information (e.g., topography or boundaries), or the like.

Figure 5:
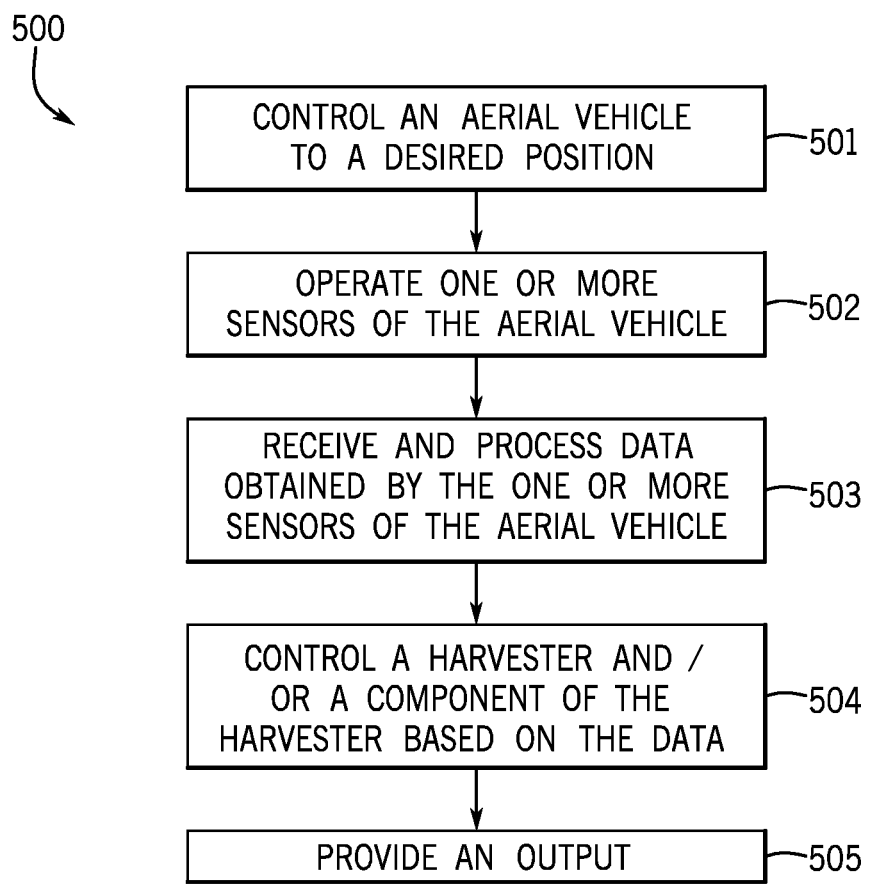
FIG. 5 is a flow diagram of a method of operating the system having the harvester and the aerial vehicle of FIG. 1, in accordance with an embodiment of the present disclosure.

FIG. 5 is a flow diagram of an embodiment of a method 500 of operating the system 100 having the harvester 110 and the aerial vehicle 120 of FIG. 1. The method 500 includes various steps represented by blocks. It should be noted that the method 500 may be performed as an automated procedure by a system, such as the control system 200. Although the flow chart illustrates the steps in a certain sequence, it should be understood that the steps may be performed in any suitable order, certain steps may be omitted, and certain steps may be carried out simultaneously, where appropriate. Further, certain steps or portions of the method 500 may be performed by separate devices. For example, a first portion of the method may be performed by the controller 210, while a second portion of the method may be performed by the controller 240. It should be understood that the various features disclosed above with respect to FIGS. 1-4 may be incorporated and/or utilized with the steps of the method 500. While the method 500 is described with reference to the aerial vehicle 120 to facilitate discussion, it should be understood that the steps of the method 500 may be applied to various types of monitoring vehicles, such as surface vehicles.

In step 501, a controller (e.g., the controller 210, 220, 230) may control the aerial vehicle 120 to a desired position. For example, in some embodiments, the aerial vehicle 120 may be controlled based on an operator input provided at the input 203 of the harvester 110, based on an operator input provided at the input 234 of the base station 230, and/or autonomously based on preprogrammed instructions stored on the aerial vehicle 120. In step 502, a controller may operate the one or more sensors 121 of the aerial vehicle 120 to obtain data indicative of various features of the harvester 110, another vehicle 303, and/or an agricultural field. In step 503, a controller may receive and process the data from the one or more sensors 121 of the aerial vehicle 120. For example, the controller may process the data to generate images (e.g., images 404, 405) and/or a map (e.g., a residue map, such as the map 401). As discussed above, in some embodiments, the controller may generate a modified residue map by combining data related to the residue with various other features and/or information (e.g., topography, boundaries, rocks, yield maps, or the like). In step 504, the controller may control the harvester 110 and/or various components of the harvester 110 (e.g., header 116, residue spreader 117, feeder tube 119, crop-processing tools 209, and related systems 213-216, etc.) based on the data obtained by the one or more sensors 121. For example, the controller may automatically raise the header 116 vertically away from the ground if the harvester 110 is approaching an obstacle. In step 505, the controller may provide an output, such as the image or map generated at step 503, an alarm, a control signal, and/or another indication, as discussed above.

While the harvester 110 and the aerial vehicle 120 are shown operating in conjunction with one another, in some embodiments, the aerial vehicle 120 may be used by itself, for example, to provide for or update an image of the agricultural field. While the aerial vehicle 120 is shown as a self-propelled vehicle that is physically separate from the harvester 110, it should be understood that the aerial vehicle 120 may be physically attached to the harvester 110 (e.g., mounted on a pole vertically above the work vehicle 110). While the illustrated harvester 110 is controlled locally by an operator supported within the harvester 110, it should be understood that the harvester 110 may be a remotely controlled (e.g., by an operator located at the base station 230) and/or autonomously controlled (e.g., based on preprogrammed instructions).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
an agricultural vehicle configured to output an agricultural product;
a support vehicle comprising a storage container; and
an aerial vehicle comprising one or more sensors configured to monitor a fullness of the storage container, wherein the aerial vehicle is configured to provide a first signal indicative of the fullness of the storage container to the agricultural vehicle;
wherein the agricultural vehicle comprises a controller having a memory and a processor, and the controller is configured to control a feeder tube control system of the agricultural vehicle to adjust a transfer rate of the agricultural product from the agricultural vehicle to the storage container based on the first signal.

2. The system of claim 1, wherein the aerial vehicle comprises a first communication device that is configured to wirelessly transmit the first signal to a second communication device of the agricultural vehicle.

3. The system of claim 1, wherein the controller is configured to process the first signal to generate an image of the storage container and to control a display within the agricultural vehicle to provide the image.

4. The system of claim 1, wherein the controller is configured to process the first signal and to provide an alarm when the first signal indicates that the fullness of the storage container reaches a predetermined limit.

5. The system of claim 1, wherein the one or more sensors are configured to monitor a characteristic of residue discharged by the agricultural vehicle, the aerial vehicle is configured to output a second signal indicative of the characteristic of the residue to the controller, and the controller is configured to process the second signal to generate a residue map for an agricultural field.

6. The system of claim 1, wherein the aerial vehicle is configured to monitor the fullness of the storage container as the agricultural vehicle and the support vehicle travel across an agricultural field.

7. The system of claim 1, wherein the one or more sensors are configured to monitor a density of crops in front of the agricultural vehicle relative to a direction of travel of the agricultural vehicle.

8. The system of claim 1, wherein the one or more sensors are configured to monitor a distance between a header of the agricultural vehicle and a crop edge.

9. The system of claim 1, wherein the aerial vehicle is configured to be remotely controlled to change positions via an operator input at an operator interface of the agricultural vehicle.

10. The system of claim 1, wherein the aerial vehicle is configured to automatically move with the agricultural vehicle.

11. The system of claim 1, wherein the controller is configured to control the feeder tube control system to adjust a position of a feeder tube of the agricultural vehicle based on the first signal to facilitate distribution of the agricultural product within the storage container.

12. A system, comprising:
an agricultural vehicle configured to output an agricultural product, wherein the agricultural vehicle comprises a residue spreader configured to discharge residue to an agricultural field;
a support vehicle comprising a storage container; and
an aerial vehicle comprising one or more sensors configured to monitor a fullness of the storage container, wherein the aerial vehicle is configured to provide a first signal indicative of the fullness of the storage container to the agricultural vehicle;
wherein the agricultural vehicle comprises a controller having a memory and a process, the one or more sensors are configured to monitor a characteristic of the residue discharged by the residue spreader, and the aerial vehicle is configured to output a second signal indicative of the characteristic of the residue to the controller;
wherein the controller is configured to process the second signal to generate a residue map for the agricultural field, the controller is configured to control a residue spreader control system to adjust components of the residue spreader based on the second signal, or a combination thereof.

13. The system of claim 12, wherein the characteristic of the residue comprises a velocity of the residue as the residue exits an outlet of the residue spreader, a drift of the residue, or a combination thereof.

14. The system of claim 12, wherein the characteristic of the residue comprises percentage of the agricultural field covered by residue, average size of the residue, width of a mat of the residue on the agricultural field, thickness of the mat of the residue, density of the mat of the residue, or evenness of a spread of the residue.

15. The system of claim 12, wherein the controller is configured to control the residue spreader control system to adjust the components of the residue spreader based on the second signal to adjust an orientation, a direction, a velocity, a width, or a combination thereof, of the residue discharged from the residue spreader.

16. The system of claim 12, wherein the one or more sensors are configured to monitor a density of crops in front of the agricultural vehicle relative to a direction of travel of the agricultural vehicle.

17. The system of claim 12, wherein the one or more sensors are configured to monitor a distance between a header of the agricultural vehicle and a crop edge.

18. The system of claim 12, wherein the aerial vehicle is configured to automatically move with the agricultural vehicle.

19. The system of claim 12, wherein the aerial vehicle is configured to be remotely controlled to change positions via an operator input at an operator interface of the agricultural vehicle.

* * * * *